Oct. 2, 1951 — H. LEHR — 2,569,613
WORK-HOLDER FOR SHAPERS
Filed April 28, 1950 — 2 Sheets-Sheet 1

INVENTOR.
HENRY LEHR
BY
McMorrow, Berman & Davidson
ATTORNEYS

Oct. 2, 1951  H. LEHR  2,569,613
WORK-HOLDER FOR SHAPERS
Filed April 28, 1950  2 Sheets-Sheet 2
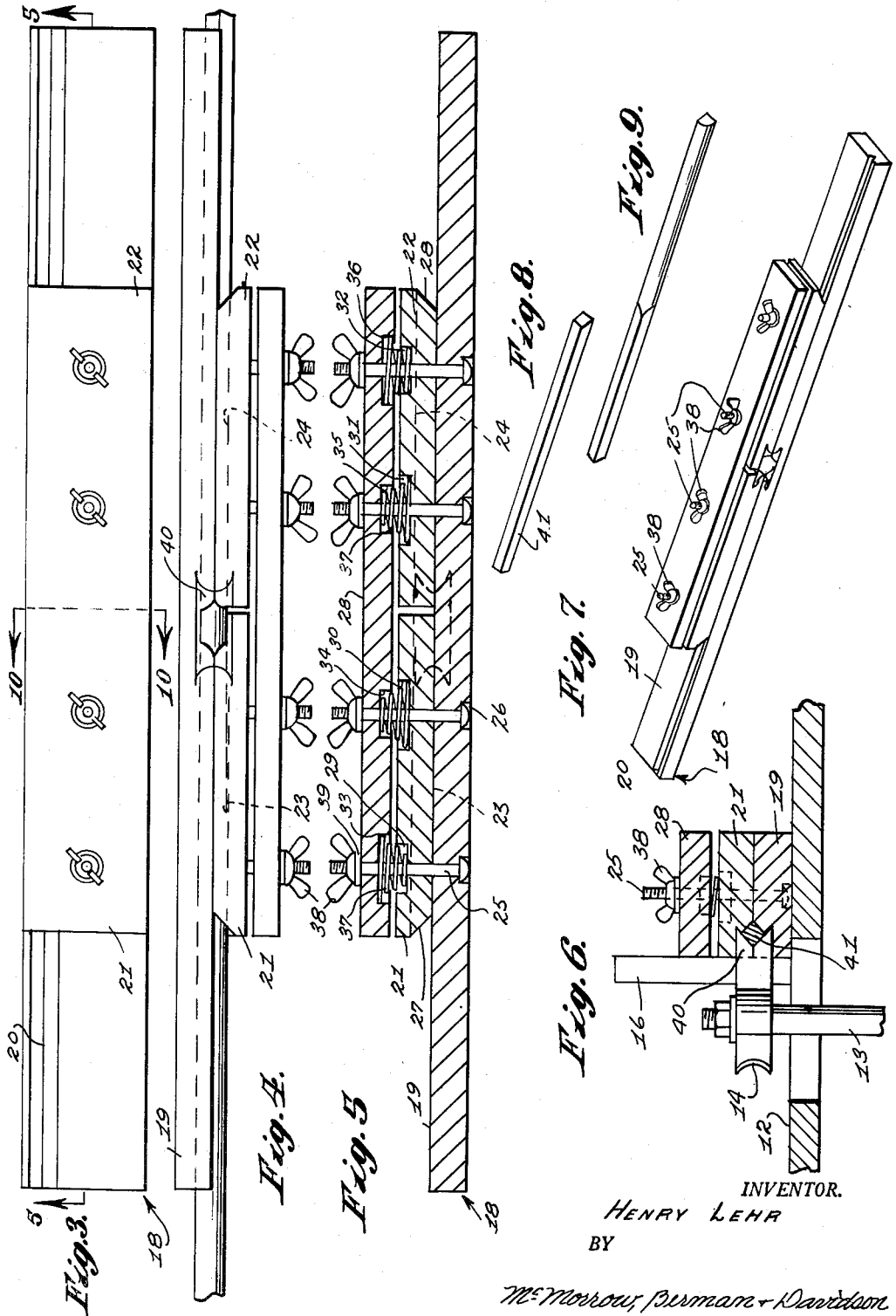
INVENTOR.
HENRY LEHR
BY
McMorrow, Berman & Davidson
ATTORNEYS Patented Oct. 2, 1951

2,569,613

UNITED STATES PATENT OFFICE 2,569,613

WORK-HOLDER FOR SHAPERS

Henry Lehr, Flint, Mich.

Application April 28, 1950, Serial No. 158,758

1 Claim. (Cl. 144—253)

This invention relates to work holders for wood-working tools, such as shapers, and more particularly to a work holder for holding work pieces for cutting molding strips on a power operated wood shaper.

It is among the objects of the invention to provide an improved work holder which can be clamped on a shaper table adjacent the shaper blade or cutter to hold elongated work pieces against the cutter while the work pieces are moved through the holder to shape them into molding strips, which work holder resiliently clamps an elongated work piece therein but permits sliding movement of the work piece through the holder and past the cutter, which provides separate clamping pieces at opposite sides of the cutter so that the work piece is firmly held both before and after it has been operated on by the cutter, and which may be used to hold work pieces of different sizes against the cutter blades.

Other objects and advantages will become apparent from a consideration of the following description and the appended claims in conjunction with the accompanying drawings wherein:

Figure 3 is a top plan view of the work holder itself;

Figure 4 is a side elevational view of the cutter adjacent side of the work holder with a work piece extending therethrough;

Figure 5 is a longitudinal cross sectional view on the line 5—5 of Figure 3;

Figure 6 is a cross sectional view on the line 6—6 of Figure 1;

Figure 7 is a perspective view on a reduced scale of the work holder;

Figure 8 is a perspective view of an unfinished work piece;

Figure 9 is a perspective view of a partly finished work piece;

Figure 1:
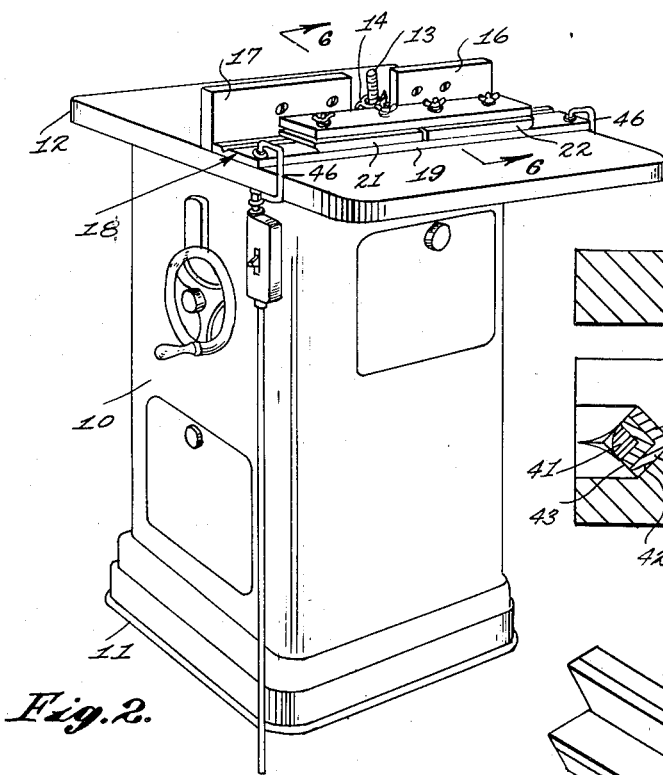
Figure 1 is a perspective view of a power operated shaper with a work holder illustrative of the invention operatively mounted on the shaper table.

With continued reference to the drawings, the wood shaper illustrated in Figure 1 comprises a generally rectangular cabinet structure 10 mounted on a base 11, a flat rectangular table 12 mounted on the upper end of the cabinet structure and projecting marginally therebeyond, a vertically disposed cutter shaft 13 projecting upwardly through the table, a cutter head 14 mounted on the shaft at the top of the table, a guard structure 15 surrounding a portion of the cutter head and a fence comprising two pieces 16 and 17 disposed in end to end relationship on the top of the table 12 and secured to the guard structure 15, these pieces being spaced apart at their adjoining ends to expose an operative portion of the cutter head.

The work holder, generally indicated at 18, comprises an elongated member 19 of rectangular cross sectional shape having a length substantially equal to the width of the shaper table 12. This member may be conveniently formed of wood and has a longitudinally extending groove 20 of triangular cross sectional shape adjacent one longitudinal edge thereof. The cross sectional shape of the groove 20 is preferably a right angle V and constitutes one half of a square area.

Two members 21 and 22 are superposed in end to end relationship on the grooved side of the member 19 and have their adjacent ends slightly spaced apart and disposed adjacent the mid-length location of the member 19. The members 21 and 22 are of rectangular cross sectional shape of substantially the same dimensions as the cross sectional shape of the member 19 and each of these members is provided adjacent one longitudinal edge with a longitudinally extending groove of triangular cross sectional shape, as indicated at 23 and 24 respectively.

When the members 21 and 22 are operatively assembled with the member 19 the grooves 23 and 24 register with the groove 20 and the complementary grooves provide a bore of square or rectangular cross sectional shape extending longitudinally through the work holder.

The member 19 is provided with apertures at spaced apart locations along the portion thereof on which the members 21 and 22 are superposed and bolts 25 extend one through each of the apertures in the member 19 and project from the grooved side of the latter. The heads of the bolts 25 are countersunk in the member 19, as indicated at 26, and the members 21 and 22 are provided with apertures receiving corresponding bolts 25. In the arrangement illustrated there are four bolts, two of which extend through the member 21 at spaced apart locations longitudinally of the latter, and two of which extend through the member 22 also at spaced apart locations longitudinally of this member. The bolts extend through the members 19, 21 and 22 at locations spaced from the grooves 20, 23 and 24 so that the bolts do not obstruct any portion of the bore provided by these grooves through the work holder.

The members 21 and 22 are beveled at their outer ends toward the member 19, as indicated at 27 and 28, to facilitate entry of a work piece into the bore of the work holder.

A flat plate 28 which may also be made of a piece of wood of rectangular cross sectional shape, extends continuously over the sides of the members 21 and 22 remote from the member 19 and this plate is provided with spaced apart apertures receiving the bolts 25.

The member 21 is provided in its side remote from the member 19 with recesses 29 and 30 respectively surrounding the two bolts 25 extending through this member with the recess 30 larger in diameter than the recess 29. The member 22 is provided in its side remote from the member 19 with recesses 31 and 32 respectively surrounding the bolts 25 extending through this member with the recess 31 larger in diameter than the recess 32 and the plate 28 is provided in its side adjacent the members 21 and 22 with complementary recesses as indicated at 33, 34, 35 and 36. The recess 33 opposite the recess 29 is larger than the recess 29 and of substantially the same size as the recesses 30 and 31. The recess 34 in plate 28 is smaller than recess 30 in member 21 to which it is opposed and is of substantially the same size as the recesses 29 and 32. Likewise, a small recess 35 opposes the large recess 31 and a large recess 36 in the plate 28 opposes a small recess 32 in the member 22. Helical springs 37 respectively surround the bolts 25 between the plate 28 and the members 21 and 22, each of these springs having its larger end received in a large recess and its smaller end received in a corresponding smaller recess. Wing nuts 38 are threaded onto the bolts 25 and bear against the side of the plate 28 remote from the members 21 and 22, a washer 39 being preferably interposed between each wing nut 38 and the adjacent side of the plate 28.

When the wing nuts are threaded onto the bolts 25 the springs 37 are compressed and resiliently urge the members 21 and 22 against the member 19. The wing nuts may be adjusted on the bolts to regulate the pressure between the members 21 and 22 and the member 19 as may be desired.

The member 19 is recessed in its groove adjacent edge and the members 21 and 22 are recessed at their adjoining ends and in their groove adjacent edges to provide a cutter receiving notch 40 in the work holder which notch opens into the bore provided by the grooves 20, 23 and 24 to provide access for the cutter 14 to a work piece 41 extending through the bore of the work holder, as particularly illustrated in Figure 6.

The work piece 41, as particularly illustrated in Figure 8, is an elongated piece of wood or similar material, sawed or otherwise formed to a square cross sectional shape of the proper dimensions for the size of the molding strip to be formed therefrom. With the shaper in operation, such a work piece is slid through the bore of the work holder and past the cutter 14 of the shaper, one longitudinal edge of the work piece being presented to the shaper blades. The other ends of the shaper blades are arcuately concaved to provide a quarter cylindrical surface on the adjacent portion of the work piece as the work piece moves past the cutter to form quarter round molding, as is particularly illustrated in Figure 9. Other molding shapes may be provided by using different blades on the cutter 14.

Figure 10:
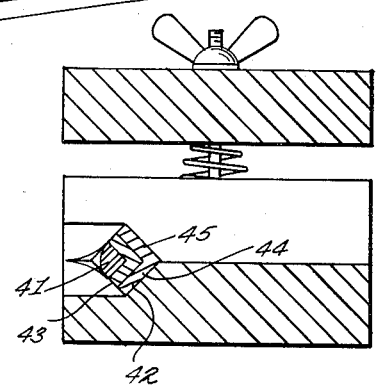
Figure 10 (sheet 1) is a transverse cross sectional view on the line 10—10 of Figure 3 showing filler strips in the work holder for accommodating the work holder to a work piece of reduced size.
Figure 11:
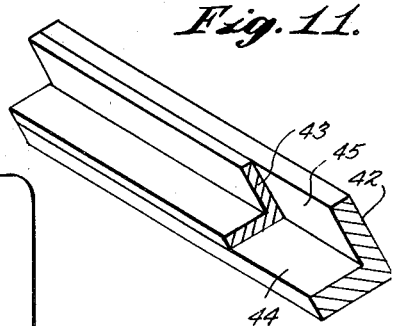
Figure 11 is a perspective view of a pair of nested filler strips.
Figure 2:
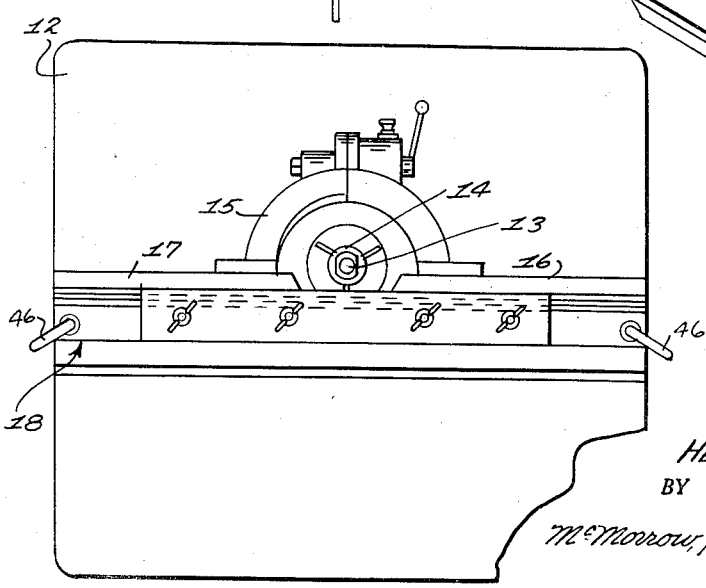
Figure 2 is a top plan view of the shaper and work holder illustrated in Figure 1.

In order to accommodate the work holder to work pieces of different sizes suitable filler strips, as indicated at 42 and 43 in Figures 10 and 11, may be inserted in the bore of the work holder.

Each of the filler strips is of L-shaped cross section having two similar or identical legs, as indicated at 44 and 45 for the strip 42, disposed at right angles to each other. In the arrangement illustrated the filler strip 42 is dimensioned to fit directly into the bore in the work holder and reduce the cross sectional area of this bore by the thickness of the legs of the filler strip while the filler strip 43 is dimensioned to fit into the filler strip 42 to further reduce the area of the bore available for the passage of the work piece therethrough.

For example, the cross section of the bore in the work holder might be one inch square and three filler strips may be provided, each having legs one quarter of an inch thick. When no filler strips are in the bore the work holder will receive a work piece which is one inch square to provide a piece of one inch quarter round molding. When only the larger filler strip is in the bore the bore will receive a work piece three quarters of an inch square to provide a molding strip of corresponding dimensions, when the next larger filler strip is in the larger filler strip the bore will receive a work piece one half inch square and when the smallest filler strip is in the intermediate filler strip the bore will receive a work piece only one quarter of an inch square. The filler strips are so dimensioned that they nest one within the other when more than one filler strip is used in the bore of the work holder. By providing a set of filler strips of different sizes, molding strips of corresponding sizes may be produced on the shaper using the same work holder.

The work holder 18 is placed on the table 12 of the shaper with the ends of the member 19 substantially flush with the opposite edges of the table at the opposite ends of the shaper fence. The groove adjacent edge of the member 19 is then placed against the side of the fence opposite the guard structure 15 and the work holder is firmly secured to the table by suitable means, such as the C clamps 46, to secure the work holder firmly in position on the shaper table and in operative association with the shaper head 14. Work pieces of square or rectangular cross sectional shape may now be passed through the work holder to produce quarter round molding strips.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A work holder mountable on a shaper table for holding elongated work pieces against a shaper cutter comprising an elongated member of rectangular cross sectional shape having a longitudinally extending groove of triangular cross sectional shape adjacent one longitudinal edge thereof, two members of rectangular cross sectional shape superimposed in end to end relationship on the grooved side of said elongated member and each having a longitudinally extending groove of triangular cross sectional shape adjacent one edge thereof, bolts projecting from said elongated member at spaced apart locations therealong and said two members having apertures therein respectively receiving said bolts, the grooves in said two members being in registry with the groove in said elongated member and said grooves together providing a bore of rectangular cross sectional shape extending longitudinally through the work holder to slidably receive an elongated work piece of corresponding cross sectional shape, said elongated member and said two members having recesses therein at the adjoining ends of said two members to provide in the work holder a cutter receiving notch opening into said bore, a plate disposed at the sides of said two members remote from said elongated member and having apertures therein respectively receiving said bolts, compression springs respectively surrounding said bolts between said plate and said two members, and nuts threaded onto said bolts at the side of said plate remote from said two members and compressing said springs to render the latter effective to resiliently and adjustably urge said two members individually toward said elongated member.

HENRY LEHR.

REFERENCES CITED

The following references are of record in the file of this patent:

UNITED STATES PATENTS

| Number | Name | Date |
|---|---|---|
| 9,220 | Pullinger | Aug. 24, 1852 |
| 1,819,081 | Dittmar | Aug. 18, 1931 |
| 2,302,961 | Kramer | Nov. 24, 1942 |

FOREIGN PATENTS

| Number | Country | Date |
|---|---|---|
| 1,554 of 1871 | Great Britain | June 12, 1871 |